(12) United States Patent
Umayahara

(10) Patent No.: US 8,130,108 B2
(45) Date of Patent: Mar. 6, 2012

(54) GAS LEVEL DISPLAY CONTROLLER, GAS LEVEL DISPLAY DEVICE, AND GAS LEVEL DISPLAY CONTROL METHOD

(75) Inventor: Kenji Umayahara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 177 days.

(21) Appl. No.: 12/679,093

(22) PCT Filed: Oct. 20, 2008

(86) PCT No.: PCT/JP2008/069389
§ 371 (c)(1),
(2), (4) Date: Mar. 19, 2010

(87) PCT Pub. No.: WO2009/054518
PCT Pub. Date: Apr. 30, 2009

(65) Prior Publication Data
US 2010/0253529 A1   Oct. 7, 2010

(30) Foreign Application Priority Data
Oct. 24, 2007   (JP) .................................. 2007-276572

(51) Int. Cl.
*G08B 17/10* (2006.01)
(52) U.S. Cl. .......................................... 340/632; 702/50
(58) Field of Classification Search .................. 340/632, 340/606, 540; 702/50; 313/587
See application file for complete search history.

(56) References Cited

U.S. PATENT DOCUMENTS
5,354,516 A * 10/1994 Tomita ....................... 261/121.1

FOREIGN PATENT DOCUMENTS

| | | |
|---|---|---|
| JP | 2003-172654 A | 6/2003 |
| JP | 2004-58616 A | 2/2004 |
| JP | 2005-240854 A | 9/2005 |
| JP | 2005-283127 A | 10/2005 |
| JP | 2006-149592 A | 6/2006 |
| JP | 2006-226511 A | 8/2006 |
| JP | 2007-321572 A | 12/2007 |
| JP | 4525728 | 6/2010 |

OTHER PUBLICATIONS

Office Action issued Jan. 5, 2010 in JP 2007-276572 and verified translation thereof (filed with PPH Request).

* cited by examiner

*Primary Examiner* — Shirley Lu
(74) *Attorney, Agent, or Firm* — Kenyon & Kenyon LLP

(57) ABSTRACT

A gas level display controller includes a mass computation module, a reference value setting module, and a display control module. The mass computation module obtains a pressure and a temperature of compressed hydrogen stored in a hydrogen tank and calculates a mass of the compressed hydrogen in the hydrogen tank, for example, according to a known gas state equation. The reference value setting module sets a reference value, which is used for display of a remaining amount of the compressed hydrogen in the hydrogen tank on a display device, to the mass of the compressed hydrogen calculated by the mass computation module on the occasion of filling the compressed hydrogen into the hydrogen tank to limitation of the hydrogen filling. The display control module calculates a ratio of the mass of the compressed hydrogen to the reference value and makes the remaining amount of the compressed hydrogen in the hydrogen tank displayed on the display device, based on the calculated ratio. This arrangement enables a symbol 'FULL' to be reliably displayed on a display device on the occasion of filling a compressed gas into a tank to limitation of the gas filling.

5 Claims, 3 Drawing Sheets

GAS LEVEL DISPLAY CONTROLLER, GAS LEVEL DISPLAY DEVICE, AND GAS LEVEL DISPLAY CONTROL METHOD

This is a 371 national phase application of PCT/JP2008/069389 filed 20 Oct. 2008, which claims priority of Japanese Patent Application No. 2007-276572 filed 24 Oct. 2007, the contents of which are incorporated herein by reference.

TECHNICAL FIELD

The present invention relates to a technique of causing a remaining amount of a compressed gas stored in a tank to be displayed on a predetermined display device.

BACKGROUND ART

Various techniques have been proposed to display the remaining amount of a compressed gas stored in a tank (see, for example, JP-A-2005-240854). The technique disclosed in this cited reference JP-A-2005-240854 displays the remaining amount of a compressed gas fuel (compressed gas) stored in a tank, based on the pressure and the mass of the compressed gas fuel. Other known relevant techniques include those disclosed in JP-A-2006-226511 and JP-A-2005-283127.

From the safety standpoint, there are standards set for a tank used for storage of a compressed gas with regard to the pressure and the temperature of the stored compressed gas. The compressed gas is filled into the tank according to these standards. Namely the amount (mass) of the compressed gas filled into the tank is limited by the pressure or the temperature of the compressed gas in the tank. For example, on the condition that the temperature of the compressed gas in the tank is increased by adiabatic compression in the course of filling the compressed gas into the tank and reaches a preset reference temperature, the filling of the compressed gas into the tank is stopped even when the pressure of the compressed gas in the tank is lower than a preset reference pressure. On the condition that the temperature of the compressed gas in the tank increases by adiabatic compression is still lower than the preset reference temperature, on the other hand, the filling of the compressed gas into the tank is stopped when the pressure of the compressed gas in the tank reaches the preset reference pressure.

The technique disclosed in the cited reference JP-A-2005-240854, however, does not make display of a symbol 'FULL' representing that the amount of the compressed gas filled into the tank reaches its full level, when the amount (mass) of the compressed gas filled into the tank is limited by the temperature of the compressed gas in the tank. Even once the pressure of the compressed gas in the tank reaches the preset reference pressure to make display of the symbol 'FULL', a decrease in pressure of the compressed gas in the tank over time with a decrease in temperature of the compressed gas leads to the disappearance of the display of the symbol 'FULL' without any consumption of the compressed gas. The absence of the display of the symbol 'FULL' in spite of the compressed gas filled into the tank to its full level makes the user feel strange.

DISCLOSURE OF THE INVENTION

In order to solve the problem of the prior art discussed above, there would be a requirement for assuring display of a symbol 'FULL' on a display device on the occasion of filling a compressed gas into a tank to limitation of the gas filling.

The present invention accomplishes at least part of the requirement mentioned above and the other relevant requirements by any of various aspects and applications discussed below.

One aspect of the invention is directed to a gas level display controller constructed to cause a remaining amount of a compressed gas stored in a tank to be displayed on a predetermined display device. The gas level display controller includes: a mass computation module configured to calculate a mass of the compressed gas from a pressure of the compressed gas and a temperature of the compressed gas; a reference value setting module configured to set a reference value, which is used for display of the remaining amount of the compressed gas on the display device, to a mass of the compressed gas calculated by the mass computation module on an occasion of a stop of gas filling when at least one of the pressure and the temperature of the compressed gas satisfies a preset condition during filling the compressed gas into the tank; and a display control module configured to, on the assumption that the reference value represents a mass of the compressed gas filled into the tank to its full level, make the remaining amount of the compressed gas displayed on the display device, based on a ratio of the mass of the compressed gas calculated by the mass computation module to the reference value.

The gas level display controller according to this aspect of the invention makes an assumption that the mass of the compressed gas in the tank calculated on the occasion of a stop of gas filling when at least one of the pressure and the temperature of the compressed gas in the tank satisfies the preset condition is equal to the mass of the compressed gas filled into the tank to its full level. The gas level display controller then makes the remaining amount of the compressed gas in the tank displayed on the display device, based on the ratio of the mass of the compressed gas calculated after completion of filling the compressed gas into the tank to the mass of the compressed gas on the above assumption (that is set to the reference value). Even in the event of a variation in temperature or pressure of the compressed gas in the tank without consumption of the compressed gas filled into the tank to limitation (stop) of the gas filling, the gas level display controller according to this aspect of the invention enables a symbol 'FULL' to be reliably displayed on the display device. With consumption of the compressed gas in the tank, the consumption rate of the compressed gas from the 'FULL' level, that is, the remaining amount of the compressed gas in the tank is displayed on the display device. The display of the remaining amount of the compressed gas on the display device may be performed in analog presentation, in digital presentation, or in percentage presentation.

In one preferable application of the gas level display controller according to the above aspect of the invention, the preset condition includes a condition that the pressure of the compressed gas reaches an upper limit of an allowable pressure range in the tank.

Even in the event of a decrease in pressure of the compressed gas in the tank over time with a decrease in temperature of the compressed gas without consumption of the compressed gas filled into the tank to the limitation that the pressure of the compressed gas reaches the upper limit of the allowable pressure range in the tank, the gas level display controller of this application enables the symbol 'FULL' to be reliably displayed on the display device.

In another preferable application of the gas level display controller according to the above aspect of the invention, the preset condition includes a condition that the temperature of the compressed gas reaches an upper limit of an allowable temperature range in the tank.

Even when the amount (mass) of the compressed gas filled into the tank is limited by the limitation that the temperature of the compressed gas reaches the upper limit of the allowable temperature range in the tank, the gas level display controller of this application enables the symbol 'FULL' to be reliably displayed on the display device.

In one preferable embodiment of the gas level display controller according to the above aspect of the invention, a lower limit for the mass of the compressed gas is set in a specific range that is capable of supply of the compressed gas from the tank at or above a preset pressure level. When the mass of the compressed gas decreases to or below the lower limit, the display control module makes a display urging a user to fill the compressed gas into the tank on the display device.

The gas level display controller of this embodiment can urge the user to fill the compressed gas into the tank, prior to the actual failure of supply of the compressed gas from the tank at or above the preset pressure level. The display urging the user to fill the compressed gas into the tank may be, for example, display of a symbol 'EMPTY' or lighting or flashing an EMPTY lamp. The 'lower limit' may be a fixed value or may be varied according to the pressure or the temperature of the compressed gas in the tank.

According to another aspect, the invention is also directed to another gas level display controller constructed to cause a remaining amount of a compressed gas stored in a tank to be displayed on a predetermined display device. The gas level display controller includes a display control module configured to, on an occasion of a stop of gas filling when at least one of a pressure and a temperature of the compressed gas satisfies a preset condition during filling the compressed gas into the tank, make a display representing a maximum level of the remaining amount on the display device.

Even in the event of a variation in temperature or pressure of the compressed gas in the tank without consumption of the compressed gas filled into the tank to limitation (stop) of the gas filling, the gas level display controller according to this aspect of the invention enables the symbol 'FULL' to be reliably displayed on the display device.

In one preferable application of the gas level display controller according to the above aspect of the invention, the preset condition includes a condition that the pressure of the compressed gas reaches an upper limit of an allowable pressure range in the tank.

Even in the event of a decrease in pressure of the compressed gas in the tank over time with a decrease in temperature of the compressed gas without consumption of the compressed gas filled into the tank to the limitation that the pressure of the compressed gas reaches the upper limit of the allowable pressure range in the tank, the gas level display controller of this application enables the symbol 'FULL' to be reliably displayed on the display device.

In another preferable application of the gas level display controller according to the above aspect of the invention, the preset condition includes a condition that the temperature of the compressed gas reaches an upper limit of an allowable temperature range in the tank.

Even when the amount (mass) of the compressed gas filled into the tank is limited by the limitation that the temperature of the compressed gas reaches the upper limit of the allowable temperature range in the tank, the gas level display controller of this application enables the symbol 'FULL' to be reliably displayed on the display device.

According to still another aspect, the invention is further directed to a gas level display device constructed to display a remaining amount of a compressed gas stored in a tank. The gas level display device includes: the gas level display controller having any of the configurations discussed above; and the display device.

The invention is not restricted to the gas level display controller or the gas level display device discussed above but may also be actualized by diversity of other applications, for example, a gas level display system, a gas level display control method, computer programs executed to attain the functions of these gas level display controller, device, system, and control method, recording media with such computer programs recorded therein, and data signals embodied in carrier waves to include such computer programs. Any of the additional arrangements discussed above may be adopted for any of these applications.

In the applications of the computer programs or the recording media with the computer programs recorded therein, the principle of the invention may be actualized as the whole programs for controlling the operations of the gas level display controller, the gas level display device, and the gas level display system or as part of the programs involved in the characteristics and the functions of the invention. Available examples of the recording medium include flexible disks, CD-ROMs, DVD-ROMs, magneto-optic disks, IC cards, ROM cartridges, punched cards, printed matter with barcodes or other suitable codes printed thereon, internal storage devices (memories like RAM and ROM) of the computer, external storage devices, and diversity of other computer readable media.

BEST MODES OF CARRYING OUT THE INVENTION

One mode of carrying out the invention is described below as a preferred embodiment.

A. Gas level Display System

Figure 1:
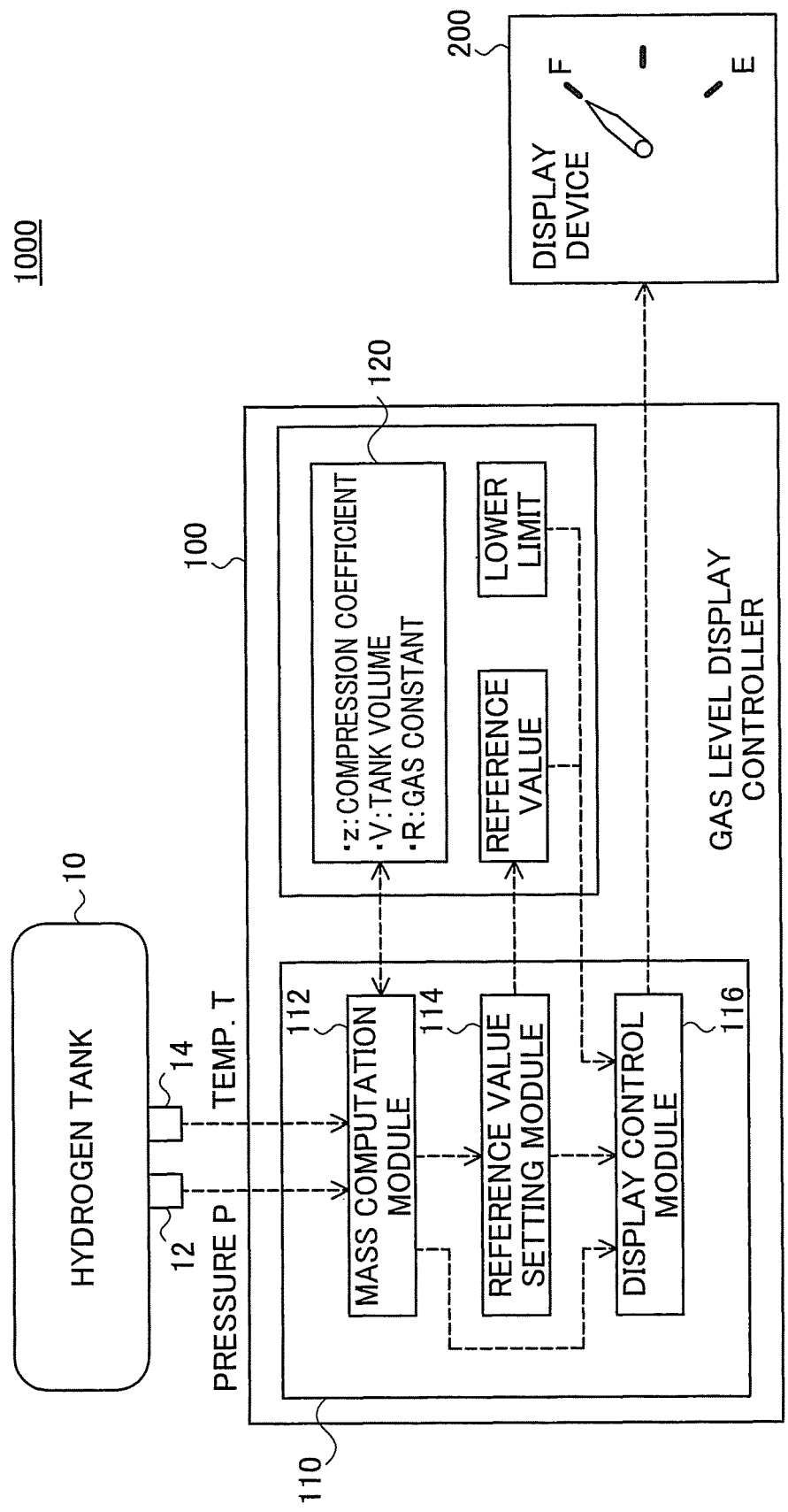
FIG. 1 is an explanatory view illustrating the schematic configuration of a gas level display system 1000 including a gas level display controller according to one embodiment of the invention.

FIG. 1 is an explanatory view illustrating the schematic configuration of a gas level display system 1000 including a gas level display controller according to one embodiment of the invention. The gas level display system 1000 may be mounted on, for example, an electric vehicle driven with driving power from a motor, which consumes supply of electric power generated in fuel cells through an electrochemical reaction of hydrogen with oxygen.

As illustrated, the gas level display system 1000 includes a hydrogen tank 10, a gas level display controller 100, and a display device 200.

The hydrogen tank 10 is equipped with a pressure sensor 12 arranged to measure a pressure P of compressed hydrogen stored in the hydrogen tank 10 and with a temperature sensor 14 arranged to measure a temperature T of the compressed hydrogen stored in the hydrogen tank 10. From the safety standpoint, there are standards set for the hydrogen tank 10 with regard to the pressure and the temperature of the compressed hydrogen stored therein. At the time of filling the compressed hydrogen into the hydrogen tank 10 in a hydrogen station, the hydrogen filling is stopped when the pressure of the compressed hydrogen in the hydrogen tank 10 reaches a preset reference pressure (an upper limit of an allowable pressure range in the hydrogen tank 10; for example, 70 MPa) or when the temperature of the compressed hydrogen in the hydrogen tank 10 reaches a preset reference temperature (an upper limit of an allowable temperature range in the hydrogen tank 10; for example, 85° C.) by adiabatic compression.

The gas level display controller 100 includes a CPU 110, a ROM 120, and a RAM (not shown). The ROM 120 includes both a non-rewritable ROM and a rewritable ROM. The ROM 120 stores therein parameters used for calculating a mass of the compressed hydrogen in the hydrogen tank 10 and parameters used for display control. In this embodiment, a compression coefficient 'z' of hydrogen, a tank volume V of the hydrogen tank 10, a gas constant R, and the molecular weight of hydrogen are stored as the parameters used for calculating the remaining amount (the mass) of the compressed hydrogen in the hydrogen tank 10. The compression coefficient 'z' varies according to the pressure and the temperature of the gas and is accordingly stored in the form of a map. A reference value and a lower limit (discussed later) are stored as the parameters used for the display control.

The CPU 110 includes a mass computation module 112, a reference value setting module 114, and a display control module 116. The CPU 110 reads a specified program from the ROM 120 to actualize these functional blocks. At least part of these functional blocks may be actualized by the hardware configuration.

The mass computation module 112 calculates a mass of the compressed hydrogen in the hydrogen tank 10 according to a known gas state equation. Specifically the mass computation module 112 obtains the pressure P of the compressed hydrogen in the hydrogen tank 10 measured by the pressure sensor 12 and the temperature T of the compressed hydrogen in the hydrogen tank 10 measured by the temperature sensor 14 and calculates the mass of the compressed hydrogen in the hydrogen tank 10 from the compression coefficient 'z' set corresponding to the obtained values of the pressure P and the temperature T, the preset tank volume V of the hydrogen tank 10, the gas constant R, and the molecular weight of hydrogen. The relation of these parameters is expressed as $PV=znRT$, where 'n' denotes the number of moles of hydrogen. This equation is rewritten to $n=(PV)/(zRT)$. The mass of the compressed hydrogen in the hydrogen tank 10 is given as the product of the number of moles 'n' of hydrogen and the molecular weight of hydrogen.

The reference value setting module 114 sets a reference value to a mass of the compressed hydrogen in the hydrogen tank 10 calculated by the mass computation module 112 under the condition that the hydrogen tank 10 has been filled with the compressed hydrogen to the upper limit of the allowable pressure range in the hydrogen tank 10 or to the upper limit of the allowable temperature range in the hydrogen tank 10, and stores the set reference value into the ROM 120. The reference value is used by the display control module 116 to make the remaining amount of the compressed hydrogen in the hydrogen tank 10 displayed on the display device 200 as discussed later. The detection of whether the hydrogen tank 10 has been filled or has not yet been filled with the compressed hydrogen to the upper limit of the allowable pressure range in the hydrogen tank 10 or to the upper limit of the allowable temperature range in the hydrogen tank 10 may be based on the monitoring results of the output of the pressure sensor 12 and the output of the temperature sensor 14.

The display control module 116 determines the remaining amount of the compressed hydrogen in the hydrogen tank 10, which is to be displayed on the display device 200, based on the comparison between the mass of the compressed hydrogen in the hydrogen tank 10 calculated by the mass computation module 112 and the reference value stored in the ROM 120 and makes the determined remaining amount of the compressed hydrogen displayed on the display device 200.

B. Gas Level Display Control

B1. Gas Level Display Control at the Time of Filling Compressed Hydrogen

Figure 2:
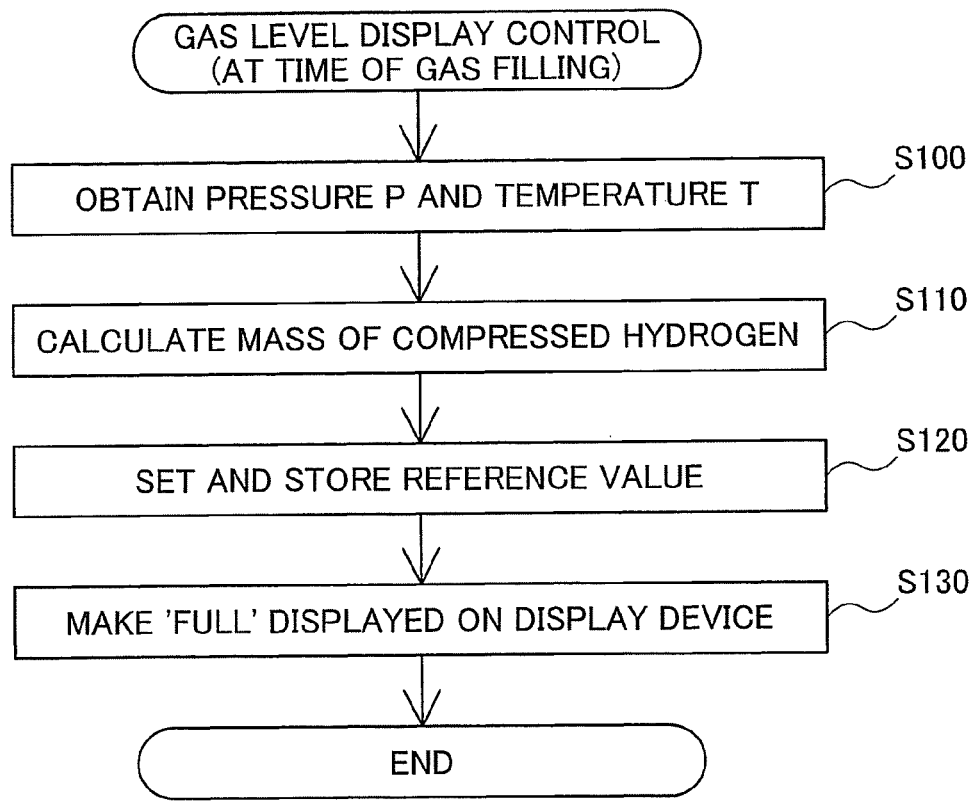
FIG. 2 is a flowchart showing a flow of gas level display control at the time of filling compressed hydrogen into a hydrogen tank 10.

FIG. 2 is a flowchart showing a flow of gas level display control at the time of filling the compressed hydrogen into the hydrogen tank 10. The CPU 110 performs the flow of gas level display control at the time of filling the compressed hydrogen into the hydrogen tank 10 to the upper limit of the allowable pressure range in the hydrogen tank 10 or to the upper limit of the allowable temperature range in the hydrogen tank 10, that is, until the user' recognition that the hydrogen tank 10 has been filled up with the compressed hydrogen to its full level.

The CPU 110 first obtains the pressure P of the compressed hydrogen in the hydrogen tank 10 measured by the pressure sensor 12 and the temperature T of the compressed hydrogen in the hydrogen tank 10 measured by the temperature sensor 14 (step S100).

The CPU 110 or specifically the mass computation module 112 then calculates the mass of the compressed hydrogen in the hydrogen tank 10 (step S110) according to the procedure explained above.

The CPU 110 or specifically the reference value setting module 114 sets the mass of the compressed hydrogen in the hydrogen tank 10 calculated at step S110 to the reference value and stores the set reference value into the ROM 120 (step S120). The reference value is set on the assumption that the mass of the compressed hydrogen filled into the hydrogen tank 10 to the upper limit of the allowable pressure range in the hydrogen tank 10 or to the upper limit of the allowable temperature range in the hydrogen tank 10 is equal to the mass of the compressed hydrogen filled into the hydrogen tank 10 to its full level. The reference value is accordingly reset at every time of filling the compressed hydrogen into the hydrogen tank 10 to the upper limit of the allowable pressure range in the hydrogen tank 10 or to the upper limit of the allowable temperature range in the hydrogen tank 10.

The CPU 110 or specifically the display control module 116 calculates a ratio of the mass of the compressed hydrogen calculated at step S110 to the stored reference value, determines a remaining amount of the compressed hydrogen, which is to be displayed on the display device 200, based on the calculated ratio, and makes a symbol 'F: FULL', which represents that the hydrogen tank 10 has been filled up with the compressed hydrogen to its full level, displayed on the display device 200 (step S130). At the time of filling the compressed hydrogen into the hydrogen tank 10, the reference value is equal to the mass of the compressed hydrogen calculated at step S110. The display controller 116 thus makes the symbol 'F: FULL' representing the full level of the compressed hydrogen in the hydrogen tank 10, displayed on the display device 200.

The CPU 110 then terminates this series of gas level display control at the time of filling the compressed hydrogen.

B2. Gas Level Display Control after Completion of Filling Compressed Hydrogen

Figure 3:
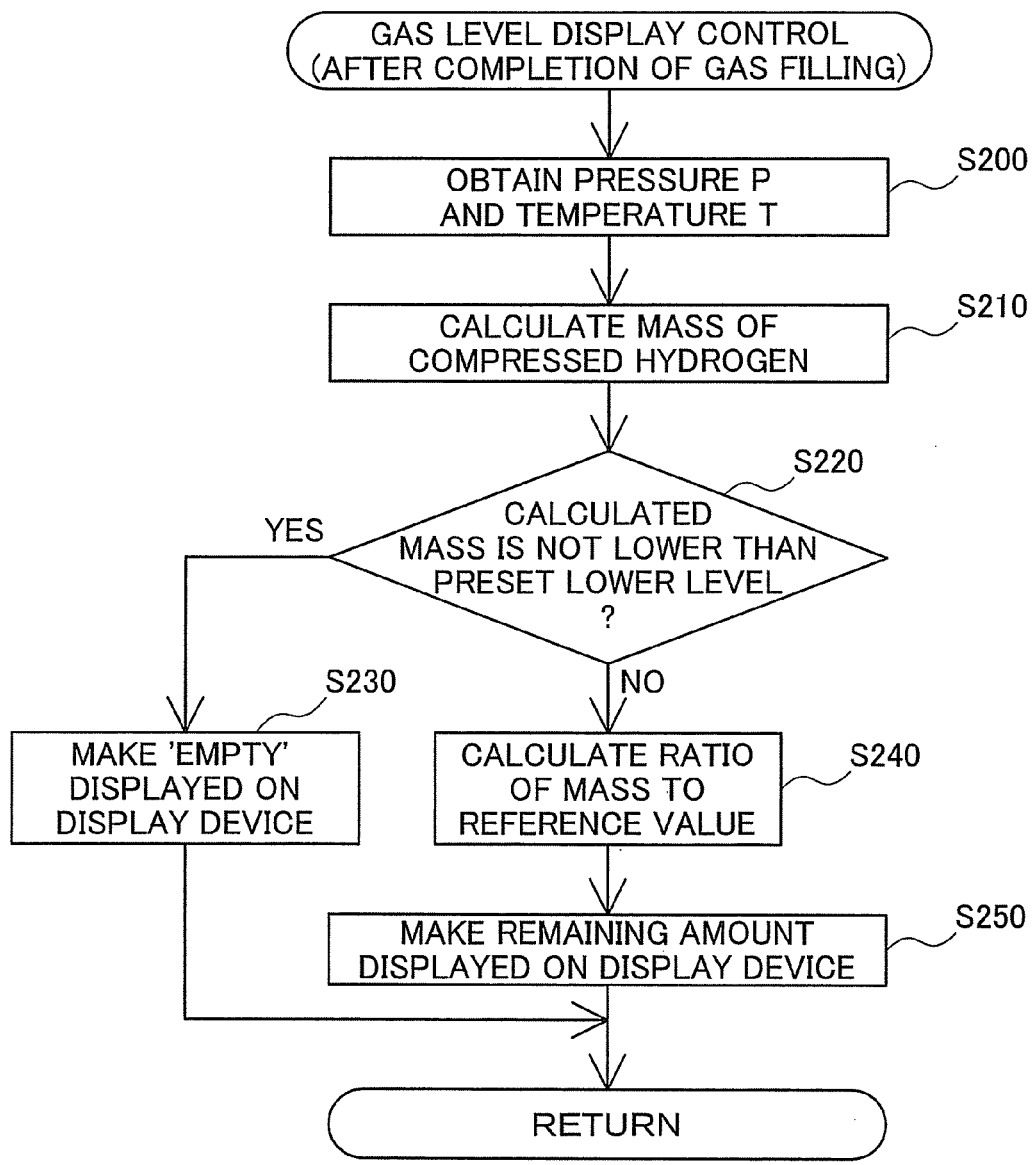
FIG. 3 is a flowchart showing a flow of gas level display control after completion of filling the compressed hydrogen into the hydrogen tank 10.

FIG. 3 is a flowchart showing a flow of gas level display control after completion of filling the compressed hydrogen into the hydrogen tank 10. The CPU 110 repeatedly performs the flow of gas level display control after completion of filling the compressed hydrogen into the hydrogen tank 10, for example, during the use of the compressed hydrogen.

The CPU 110 first obtains the pressure P of the compressed hydrogen in the hydrogen tank 10 measured by the pressure sensor 12 and the temperature T of the compressed hydrogen in the hydrogen tank 10 measured by the temperature sensor 14 (step S200).

The CPU 110 or specifically the mass computation module 112 then calculates the mass of the compressed hydrogen in the hydrogen tank 10 (step S210) according to the procedure explained above.

The CPU 110 or specifically the display control module 116 determines whether the mass of the compressed hydrogen in the hydrogen tank 10 calculated at step S210 is not higher than a preset lower limit stored in the ROM 120 (step S220). In this embodiment, the lower limit has been set in advance in a specific range that is capable of supply of the compressed hydrogen from the hydrogen tank 10 at or above a preset pressure level.

When the mass of the compressed hydrogen in the hydrogen tank 10 is not higher than the preset lower limit (step S220: No), the CPU 110 or specifically the display control module 116 makes a symbol 'E: EMPTY', which represents that the remaining amount of the compressed hydrogen in the hydrogen tank 10 approaches to a specific level incapable of supply of the compressed hydrogen from the hydrogen tank 10 at or above the preset pressure level, displayed on the display device 200 (step S230). In one concrete structure, the display device 200 may have an EMPTY lamp, which is lit up or flashes to urge the user to fill the compressed hydrogen into the hydrogen tank 10 prior to the actual failure of supply of the compressed hydrogen from the hydrogen tank 10 at or above the preset pressure level.

When the mass of the compressed hydrogen in the hydrogen tank 10 is higher than the preset lower limit (step S220: Yes), on the other hand, the CPU 110 or specifically the display control module 116 compares the reference value stored in the ROM 120 with the mass of the compressed hydrogen in the hydrogen tank 10 calculated by the mass computation module 112 at step S210 and calculates the ratio of the calculated mass to the reference value (step S240).

The CPU 110 or specifically the display control module 116 subsequently determines the remaining amount of the compressed hydrogen, which is to be displayed on the display device 200, based on the ratio calculated at step S240 and makes the determined remaining amount of the compressed hydrogen in the hydrogen tank 10 displayed on the display device 200 (step S250). In the case where the compressed hydrogen filled up into the hydrogen tank 10 is hardly consumed, the ratio calculated at step S240 is approximately equal to 1. Namely the calculated mass is substantially equal to the reference value. The CPU 110 or specifically the display control module 116 then causes the symbol 'F: FULL', which represents that the remaining amount of the compressed hydrogen in the hydrogen tank 10 is practically the full level, to be displayed on the display device 200.

As described above, the gas level display controller 100 of the embodiment makes an assumption that the mass of the compressed hydrogen in the hydrogen tank 10 calculated on the occasion of a stop of the hydrogen filling when at least one of the pressure and the temperature of the compressed hydrogen in the hydrogen tank 10 reaches the corresponding upper limit of the allowable range in the hydrogen tank 10 is equal to the mass of the compressed hydrogen filled into the hydrogen tank 10 to its full level. The gas level display controller 100 of this embodiment makes the remaining amount of the compressed hydrogen in the hydrogen tank 10 displayed on the display device 200, based on the ratio of the mass of the compressed hydrogen calculated after completion of filling the compressed hydrogen into the hydrogen tank 10 to the mass of the compressed hydrogen on the above assumption (that is set to the reference value). Even in the event of a variation in temperature or pressure of the compressed hydrogen in the hydrogen tank 10 without consumption of the compressed hydrogen filled into the hydrogen tank 10 to limitation (stop) of the hydrogen filling, this arrangement enables the symbol 'FULL' to be reliably displayed on the display device 200 and thereby desirably eliminates the user's feeling of strangeness explained previously. With consumption of the compressed hydrogen in the hydrogen tank 10, the consumption rate of the compressed hydrogen from the 'FULL' level, that is, the remaining amount of the compressed hydrogen in the hydrogen tank 10 is displayed on the display device 200.

C. Other Aspects

The embodiment discussed above is to be considered in all aspects as illustrative and not restrictive. There may be many modifications, changes, and alterations without departing from the scope or spirit of the main characteristics of the present invention. Some possible modifications are given below.

C1. Modification 1

Application of the invention to the storage of the compressed hydrogen in the hydrogen tank 10 is described in the above embodiment. The principle of the invention is, however, not restricted to the storage of the compressed hydrogen but is applicable in general to storage of any compressed gas in a gas tank.

C2. Modification 2

In the embodiment discussed above, the mass computation module 112 calculates the mass of the compressed hydrogen in the hydrogen tank 10 according to the conventional gas state equation. This is, however, neither essential nor restrictive. The mass of the compressed hydrogen may be calculated according to any other suitable equation.

C3. Modification 3

In the embodiment discussed above, the 'lower limit' used as the criterion for display of the symbol 'E: EMPTY' on the display device 200 (step S220) in the flow of gas level display control shown in FIG. 3 has been stored in advance in the ROM 120. This is, however, neither essential nor restrictive. There is only a requirement for setting the lower limit in the specific range that is capable of supply of the compressed hydrogen from the hydrogen tank 10 at or above the preset pressure level. For example, the lower limit may be changed occasionally according to the temperature T, the pressure P, or another suitable parameter of the compressed hydrogen in the hydrogen tank 10.

C4. Modification 4

In the structure of the embodiment discussed above, the gas level display controller 100 is provided separately from the display device 200. The gas level display controller and the display device may alternatively be integrated to constitute a gas level display device.

The invention claimed is

1. A gas level display controller constructed to cause a remaining amount of a compressed gas stored in a tank to be displayed on a predetermined display device, the gas level display controller comprising: a mass computation module that calculates a mass of the compressed gas from a pressure of the compressed gas and a temperature of the compressed gas; a reference value setting module that sets a reference value, which is used for display of the remaining amount of the compressed gas on the display device, to a mass of the compressed gas calculated by the mass computation module on an occasion of a stop of gas filling when at least one of the pressure and the temperature of the compressed gas satisfies a preset condition during filling the compressed gas into the tank; and a display control module, on the assumption that the reference value represents a mass of the compressed gas filled into the tank to its full level, makes the remaining amount of the compressed gas displayed on the display device, based on a ratio of the mass of the compressed gas calculated by the mass computation module to the reference value.

2. The gas level display controller in accordance with claim 1, wherein the preset condition includes a condition that the pressure of the compressed gas reaches an upper limit of an allowable pressure range in the tank.

3. The gas level display controller in accordance with claim 1, wherein the preset condition includes a condition that the temperature of the compressed gas reaches an upper limit of an allowable temperature range in the tank.

4. The gas level display controller in accordance with claim 1, wherein a lower limit for the mass of the compressed gas is set in a specific range that is capable of supply of the compressed gas from the tank at or above a preset pressure level, and when the mass of the compressed gas decreases to or below the lower limit, the display control module makes a display urging a user to fill the compressed gas into the tank on the display device.

5. A gas level display device constructed to display a remaining amount of a compressed gas stored in a tank, the gas level display device comprising:
a display device; and
a gas level display controller, the gas level display controller further comprising:
a mass computation module that calculates a mass of the compressed gas from a pressure of the compressed gas and a temperature of the compressed gas; a reference value setting module that sets a reference value, which is used for display of the remaining amount of the compressed gas on the display device, to a mass of the compressed gas calculated by the mass computation module on an occasion of a stop of gas filling when at least one of the pressure and the temperature of the compressed gas satisfies a preset condition during filling the compressed gas into the tank; and
a display control module that, on the assumption that the reference value represents a mass of the compressed gas filled into the tank to its full level, makes the remaining amount of the compressed gas displayed on the display device, based on a ratio of the mass of the compressed gas calculated by the mass computation module to the reference value.

* * * * *